(12) United States Patent
Vinogradov et al.

(10) Patent No.: US 7,597,263 B2
(45) Date of Patent: Oct. 6, 2009

(54) IMAGING READER WITH TARGET PROXIMITY SENSOR

(75) Inventors: Igor Vinogradov, Bay Shore, NY (US); Bradley Carlson, Huntington, NY (US)

(73) Assignee: Symbol Technologies, Inc., Holtsville, NY (US)

(*) Notice: Subject to any disclaimer, the term of this patent is extended or adjusted under 35 U.S.C. 154(b) by 442 days.

(21) Appl. No.: 11/496,287

(22) Filed: Jul. 31, 2006

(65) Prior Publication Data

US 2008/0023556 A1    Jan. 31, 2008

(51) Int. Cl.
*G06K 7/10* (2006.01)

(52) U.S. Cl. .................. 235/462.42; 235/439

(58) Field of Classification Search ............ 235/462.42, 235/436, 439, 455, 462.2
See application file for complete search history.

(56) References Cited

U.S. PATENT DOCUMENTS

| | | | |
|---|---|---|---|
| 5,945,658 A * | 8/1999 | Salatto et al. | 235/462.22 |
| 6,637,893 B2 * | 10/2003 | Hecht | 353/85 |
| 7,137,555 B2 * | 11/2006 | Bremer et al. | 235/462.07 |

* cited by examiner

*Primary Examiner*—Seung H Lee

(57) ABSTRACT

An illuminator illuminates a symbol with a low level of illumination in a detection mode of operation to enable an imager to detect the symbol in a working range and in a field of view of the imager in an imaging reader, and also illuminates the symbol with a high level of illumination in a reading mode of operation to enable the imager to read the symbol.

20 Claims, 3 Drawing Sheets

IMAGING READER WITH TARGET PROXIMITY SENSOR

DESCRIPTION OF THE RELATED ART

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539 and U.S. Pat. No. 5,200,599, a single, horizontal window is set flush with, and built into, a horizontal countertop of the workstation. Products to be purchased bear an identifying symbol and are typically slid or swiped across the horizontal window through which a multitude of scan lines in a scan pattern is projected in a generally upward direction. Each scan line is generated by sweeping a laser beam from a laser. When at least one of the scan lines sweeps over a symbol associated with a product, the symbol is processed and read.

Instead of, or in addition to, a horizontal slot scanner, it is known to provide a vertical slot scanner, which is typically a portable reader placed on the countertop such that its window is generally vertical and faces an operator at the workstation. The generally vertical window is oriented perpendicularly to the horizontal window, or is slightly rearwardly inclined. A scan pattern generator within the vertical slot scanner also sweeps a laser beam and projects a multitude of scan lines in a scan pattern in a generally outward direction through the vertical window toward the operator. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

These point-of-transaction workstations have been long used for processing transactions involving products associated with one-dimensional symbols each having a row of bars and spaces spaced apart along one direction, and for processing two-dimensional symbols, such as Code 39, as well. Code 39 introduced the concept of vertically stacking a plurality of rows of bar and space patterns in a single symbol. The structure of Code 39 is described in U.S. Pat. No. 4,794,239. Another two-dimensional code structure for increasing the amount of data that can be represented or stored on a given amount of surface area is known as PDF417 and is described in U.S. Pat. No. 5,304,786.

Both one- and two-dimensional symbols can also be read by employing solid-state imagers, instead of moving a laser beam across the symbols in a scan pattern. For example, an image sensor device may be employed which has a one- or two-dimensional array of cells or photosensors that correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information over a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible In the context of a point-of-transaction workstation where the operator swipes the symbol past the window, sometimes once, sometimes several times, and where the operator presents the symbol with an additional component of movement toward and away from a window, and in some cases where the symbols are transported on a moving conveyor past a window, the image of the symbol is blurred due to the relative motion between the symbol and the imager and, as a result, the image cannot be reliably and successfully decoded and read. To minimize the blur effect, the imager is typically associated with a high-speed, high-brightness illuminator to enable the image of the symbol to be acquired with sufficient light in a very short period of time, for example, on the order of 500 microseconds or less, so that the symbol image has sufficient light to be captured and read, and is not blurred even if there is relative motion between the imager and the symbol.

As advantageous as the known imaging readers are, the high-brightness illuminator may distract and bother any people, such as the operator or customers, present in the vicinity of the readers. Also, power consumption is a major concern, especially in handheld readers powered by batteries, since the high-brightness illuminator is a major energy consumer.

SUMMARY OF THE INVENTION

One feature of the present invention resides, briefly stated, in a reader for, and a method of, electro-optically reading indicia, especially one- or two-dimensional symbols, located in a working range of distances away from the reader. The reader could be embodied as a stationary or portable point-of-transaction workstation having a planar window, or as a handheld reader having a planar window. In some applications, the window can be omitted, in which event, the reader has a windowless opening at which the indicia are located for reading. As used herein, the term "presentation area" is intended to cover both a window and a windowless opening. In the case of the workstation, the symbol is swiped past, or presented to, the presentation area and, in the case of the handheld reader, the reader itself is moved and aimed at the symbol. In the preferred embodiment, the workstation is installed in a retail establishment, such as a supermarket.

A one- or two-dimensional, solid-state imager is mounted in the reader, and includes an array of image sensors operative for capturing light from a one- or two-dimensional symbol or target indicia through the presentation area over a field of view. Preferably, the array is a CCD or a CMOS array.

In accordance with this invention, an illuminator is provided for illuminating the indicia with low level illumination light in a detection mode of operation, and for illuminating the indicia with high level illumination light in a reading mode of operation. The imager is operative for capturing light from the indicia through the presentation area over the field of view in the detection mode to detect whether the indicia are present in the working range, and to change the illuminator to the reading mode when the indicia are in the working range. In addition, the imager is operative for capturing light from the indicia through the presentation area over the field of view in the reading mode to read the indicia in the working range.

The low level illumination light has just enough visibility and intensity to enable the imager to detect that indicia are located in the field of view in the working range. This low level illumination light is sufficiently dim so that it will not distract or bother people in the vicinity of the reader, and consumes correspondingly less electrical power. When the indicia are detected in the field of view and in the working range, the high level illumination light is generated to acquire the image of the indicia for decoding and reading. After a successful decoding and reading, the high level illumination light is discontinued, and the low level illumination light is generated to again assist the imager in detecting indicia.

Indicia detection can be determined by the brightness of the light captured from the indicia. Indicia located far beyond the working range will scatter and reflect back less light for the imager and, hence, the image will be dark. Indicia located within the working range will scatter and reflect back more light for the imager and will appear brighter. Hence, when the imager detects that the brightness of the image is above a threshold value, then the indicia are within the working range, and the high level illumination light is generated.

The high and low level illumination light can be generated by separate light systems, or by a single light system. One or more light emitting diodes (LEDs) are typically used as illumination light sources in each system. Preferably, an infrared (IR) LED or a near IR LED is used to emit the low level illumination light because IR light is not readily seen by the human eye and, hence, will not disturb the operator or customers in the vicinity of the reader while operating. Preferably, the IR light is at the border of the optical band of human eye sensitivity. Thus, when two separate light systems are used, one will be turned off, while the other is turned on, in each mode. When a single light system is used, one or more of a plurality of LEDs can be energized with a low drive current to generate the low level illumination light, and the same LEDs can be energized with a high drive current to generate the high level illumination light. Alternatively, when a single light system is used, one or more of a plurality of LEDs can be energized to generate the low level illumination light, and a greater number of the LEDs can be energized to generate the high level illumination light. Alternatively, different light sources capable of emitting light of different intensities can be employed.

To further improve on power consumption and to make the indicia detection more rapid and more efficient, the indicia detection may be based on analyzing only the outer peripheral marginal zones of the image captured by the imager. Rather than illuminating the entire field of view with the low level illumination light, the field of view is only illuminated at the outer marginal zones. This can, for example, be achieved by optically modifying the low level illumination light with an optical element such as an axicon. Since the central area of the field of view is not illuminated, power consumption is minimized.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
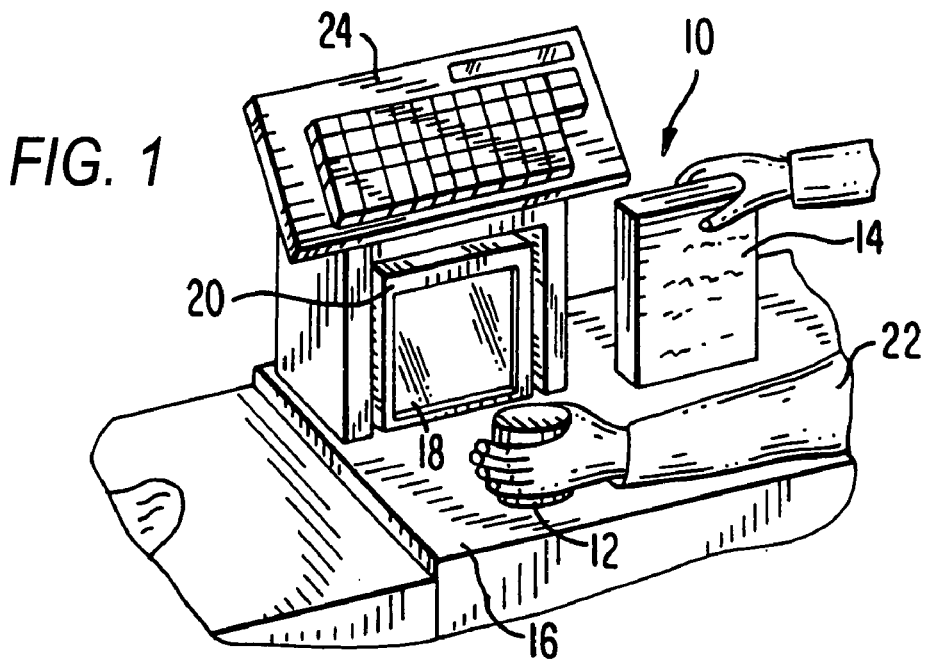
FIG. 1 is a perspective view of a point-of-transaction workstation operative for capturing light from symbol-bearing targets in accordance with this invention.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a presentation area or vertical planar window 18 of a box-shaped vertical slot reader 20 mounted on the countertop 16. A checkout clerk or operator 22 is located at one side of the countertop, and the reader 20 is located at the opposite side. A cash/credit register 24 is located within easy reach of the operator.

Figure 2:
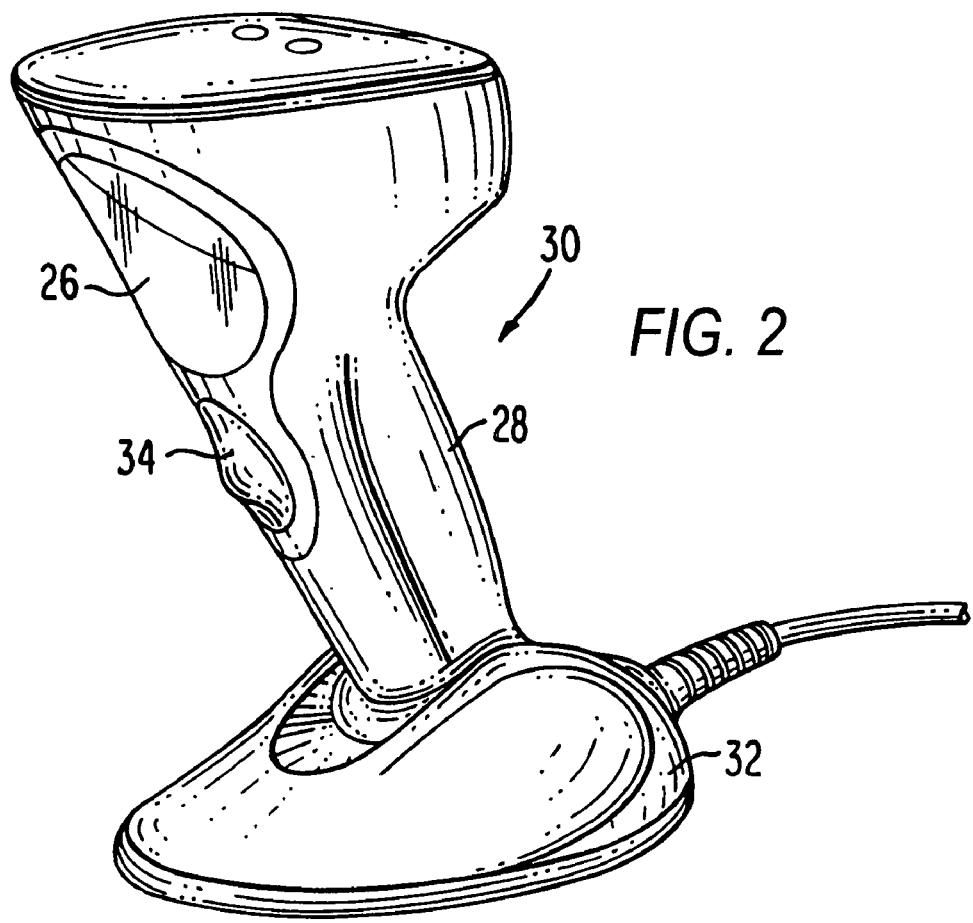
FIG. 2 is a perspective view of an electro-optical reader operative in either a hand-held mode, or a workstation mode, for capturing light from symbol-bearing targets in accordance with this invention.

Reference numeral 30 in FIG. 2 generally identifies another reader having a different configuration from that of reader 20. Reader 30 also has a presentation area or generally vertical window 26 and a gun-shaped housing 28 supported by a base 32 for supporting the reader 30 on a countertop. The reader 30 can thus be used as a stationary workstation in which products are slid or swiped past the vertical window 26, or can be picked up off the countertop and held in the operator's hand and used as a handheld reader in which a trigger 34 is manually depressed to initiate reading of the symbol.

Figure 3:
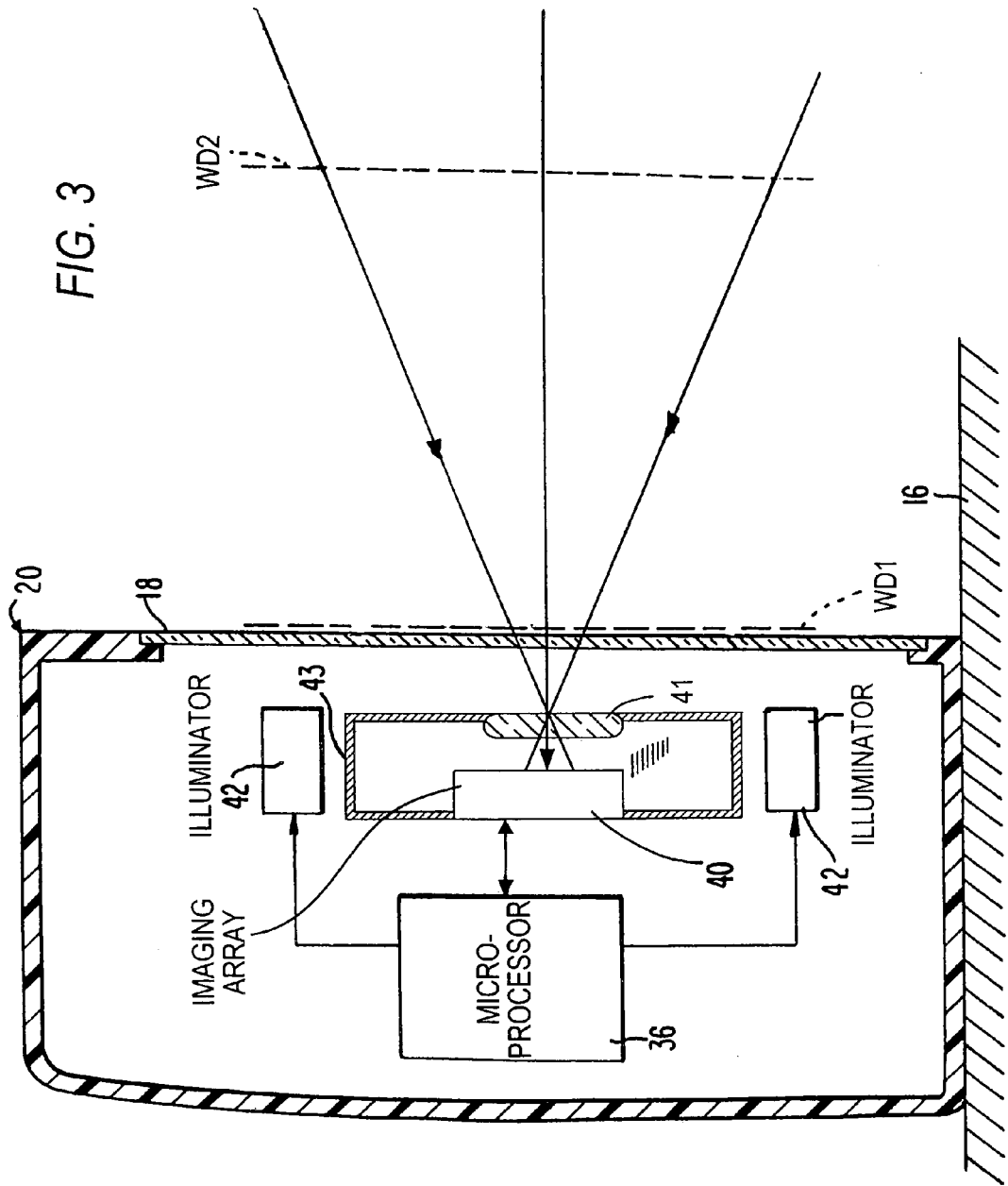
FIG. 3 is a block diagram of various components of the workstation of FIG. 1.

As schematically shown in FIG. 3, an imager 40 and a focusing lens 41 are mounted in an enclosure 43 in either reader, such as the reader 20. The imager 40 is a solid-state device, for example, a CCD or a CMOS imager and has an array of addressable image sensors operative for capturing light through the window 18 from a target, for example, a one- or two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator is also mounted in the reader and preferably includes a plurality of light sources, e.g., light emitting diodes (LEDs) 42, arranged at opposite sides of the imager 40 to uniformly illuminate the target.

As shown in FIG. 3, the imager 40 and the illuminator LEDs 42 are operatively connected to a controller or microprocessor 36 operative for controlling the operation of these components. Preferably, the microprocessor is the same as the one used for decoding light scattered from the indicia and for processing the captured target images.

Figure 4:
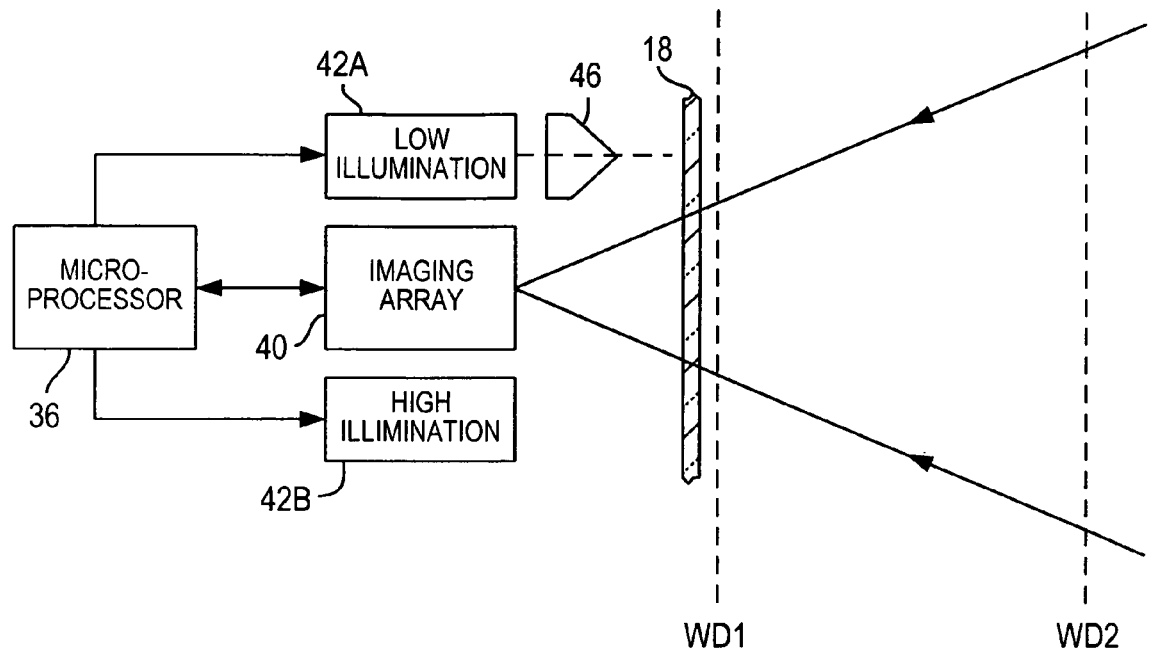
FIG. 4 is a schematic diagram of various components in the readers of FIGS. 1-2 arranged in accordance with this invention.

As shown in FIG. 4, the illuminator includes a low level illumination light system 42A for illuminating the indicia with low level illumination light in a detection mode of operation, and a high level illumination light system 42B for illuminating the indicia with high level illumination light in a reading mode of operation. The imager 40 is operative for capturing light from the indicia through the window 18 over the field of view in the detection mode to detect whether any indicia are present in the working range. When the imager 40 detects indicia in the working range, the imager signals the controller 36 and, in turn, the controller 36 controls the illuminator to change to the reading mode. The imager 40 is now operative for capturing light from the indicia through the window over the field of view in the reading mode to read the indicia in the working range.

The low level illumination light emitted by system 42A has just enough visibility and intensity to enable the imager 40 to detect that indicia are located in the field of view in the working range. This low level illumination light is sufficiently dim so that it will not distract or bother people in the vicinity of the reader, and consumes correspondingly less electrical power. When the indicia are detected in the field of view and in the working range, the high level illumination light emitted by system 42B is generated to acquire the image of the indicia for decoding and reading. After a successful decoding and reading, the high level illumination light is discontinued, and the low level illumination light is generated to again assist the imager in detecting indicia.

Indicia detection can be determined by the brightness of the light captured from the indicia. Indicia located far beyond the working range will scatter and reflect back less light for the imager and, hence, the image will be dark. Indicia located within the working range will scatter and reflect back more light for the imager and will appear brighter. Hence, when the imager detects that the brightness of the image is above a threshold value, then the indicia are within the working range, and the high level illumination light is generated.

The high and low level illumination light can be generated by the separate light systems 42A, 42B, or by a single light system. One or more light emitting diodes (LEDs) are typically used as illumination light sources in each system. Preferably, an infrared (IR) LED or a near IR LED is used to emit the low level illumination light because IR light is not readily seen by the human eye and, hence, will not disturb the operator or customers in the vicinity of the reader while operating. Preferably, the IR light is at the border of the optical band of human eye sensitivity. Thus, when two separate light systems 42A, 42B are used, one will be turned off, while the other is turned on, in each mode. When a single light system is used, one or more of a plurality of LEDs can be energized with a low drive current to generate the low level illumination light, and the same LEDs can be energized with a high drive current to generate the high level illumination light. Alternatively, when a single light system is used, one or more of a plurality of LEDs can be energized to generate the low level illumination light, and a greater number of the LEDs can be energized to generate the high level illumination light. Alternatively, different light sources capable of emitting light of different intensities can be employed.

Figure 5:
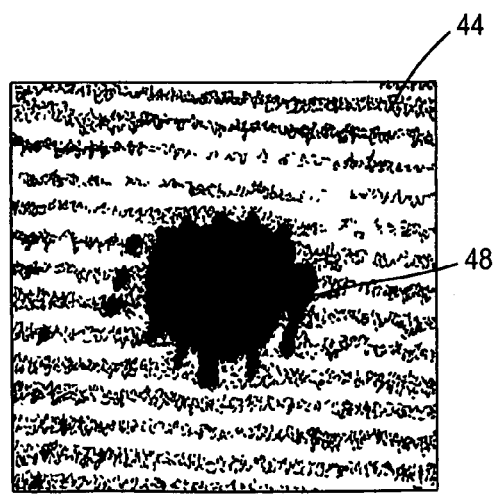
FIG. 5 is a depiction of a partially illuminated field of view of the imager used in FIG. 4 to detect indicia.

To further improve on power consumption and to make the indicia detection more rapid and more efficient, the indicia detection may be based, as shown in FIG. 5, on analyzing only the outer peripheral marginal zones 44 of the image captured by the imager 40. Rather than illuminating the entire field of view with the low level illumination light, the field of view is only illuminated at the outer marginal zones 44. This can, for example, be achieved by optically modifying the low level illumination light with an optical element such as an axicon 46, as shown in FIG. 4. Since a central area 48 of the field of view is not illuminated, power consumption is minimized.

In operation, the microprocessor 36 sends a command signal to pulse the low illumination level LEDs 42A in the detection mode and also energizes the imager 40 to collect light from any target symbol present in the working range during the detection mode. If the target symbol is detected, then the microprocessor 36 sends a command signal to pulse the high illumination level LEDs 42B in the reading mode for a short time period, say 500 microseconds or less, and energizes the imager 40 to collect light from the target symbol only during said time period. A typical array needs about 33 milliseconds to read the entire target image and operates at a frame rate of about 30 frames per second. The array may have on the order of one million addressable image sensors.

It will be understood that each of the elements described above, or two or more together, also may find a useful application in other types of constructions differing from the types described above. Thus, readers having different configurations can be used.

While the invention has been illustrated and described as an illuminator for illuminating a symbol with a low level of illumination in a detection mode of operation to enable an imager to detect the symbol in a working range and in a field of view of the imager in an imaging reader, and for illuminating the symbol with a high level of illumination in a reading mode of operation to enable the imager to read the symbol, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia in a working range of distances, comprising:
    a) a housing having a presentation area;
    b) an illuminator for illuminating the indicia with first level illumination light in a detection mode of operation, and for illuminating the indicia with second level illumination light in a reading mode of operation, wherein the light intensity of the first level illumination light is lower than the light intensity of the second level illumination light; and
    c) a solid-state imager in the housing and including an array of image sensors for capturing light over a field of view from the indicia through the presentation area in the detection mode to detect whether the indicia are present in the working range and to change the illuminator to the reading mode when the indicia are in the working range, and for capturing light over the field of view from the indicia through the presentation area in the reading mode to read the indicia in the working range.

2. The reader of claim 1, wherein the illuminator includes an illumination light source for emitting the first level illumination light, and an optical element for optically modifying the first level illumination light emitted by the illumination light source to only partially illuminate the field of view.

3. The reader of claim 2, wherein the optical element only illuminates outer peripheral margins of the field of view.

4. The reader of claim 2, wherein the illumination light source includes a light emitting diode (LED).

5. The reader of claim 4, wherein the LED emits infrared light.

6. The reader of claim 2, wherein the optical element includes an axicon.

7. The reader of claim 1, wherein the illuminator includes a plurality of illumination light sources, each operative for emitting the illumination light, and an optical element for optically modifying the first level illumination light emitted by at least one of the illumination light sources to only partially illuminate the field of view.

8. The reader of claim 1, and a controller for changing the illuminator between the detection mode and the reading mode, and wherein the imager is operatively connected to the controller to enable the controller to change the illuminator to the reading mode when the indicia are in the working range.

9. The reader of claim 8, wherein the controller is operative for changing the illuminator to the detection mode after the indicia has been read.

10. The reader of claim 1, wherein the presentation area includes a planar, light-transmissive window.

11. A reader for electro-optically reading indicia in a working range of distances, comprising:
   a) housing means having a presentation area;
   b) illuminator means for illuminating the indicia with first level illumination light in a detection mode of operation, and for illuminating the indicia with second level illumination light in a reading mode of operation, wherein the light intensity of the first level illumination light is lower than the light intensity of the second level illumination light; and
   c) solid-state imager means in the housing means and including an array of image sensors for capturing light over a field of view from the indicia through the presentation area in the detection mode to detect whether the indicia are present in the working range and to change the illuminator means to the reading mode when the indicia are in the working range, and for capturing light over the field of view from the indicia through the presentation area in the reading mode to read the indicia in the working range.

12. A method of electro-optically reading indicia in a working range of distances, comprising the steps of:
   a) illuminating the indicia with first level illumination light in a detection mode of operation, and illuminating the indicia with second level illumination light in a reading mode of operation, wherein the light intensity of the first level illumination light is lower than the light intensity of the second level illumination light; and
   b) capturing light from the indicia in the detection mode over a field of view of a solid-state imager to detect whether the indicia are present in the working range and changing to the reading mode when the indicia are in the working range, and capturing light from the indicia over the field of view in the reading mode to read the indicia in the working range.

13. The method of claim 12, wherein the illuminating step is performed by optically modifying the first level illumination light to only partially illuminate the field of view.

14. The method of claim 13, wherein the illuminating step is performed by only illuminating outer peripheral margins of the field of view.

15. The method of claim 13, wherein the optically modifying step is performed by an axicon.

16. The method of claim 12, wherein the illuminating step is performed by a light emitting diode (LED).

17. The method of claim 12, wherein the illuminating step is performed by emitting infrared light.

18. The method of claim 12, wherein the illuminating step is performed by a plurality of illumination light sources, each operative for emitting the illumination light, and an optical element for optically modifying the first level illumination light emitted by at least one of the illumination light sources to only partially illuminate the field of view.

19. The method of claim 12, and changing from the detection mode to the reading mode when the indicia are in the working range.

20. The method of claim 12, and changing from the reading mode to the detection mode after the indicia has been read.

* * * * *